United States Patent [19]

Morris et al.

[11] 3,905,767

[45] Sept. 16, 1975

[54] PROCESS FOR QUALITATIVE ANALYSIS OR QUANTITATION OF ANTIGENS OR ANTIBODIES

[75] Inventors: David Alexander Nathaniel Morris, Elkhart; Melvin Dee Smith, Mishawaka, both of Ind.

[73] Assignee: Miles Laboratories, Inc., Elkhart, Ind.

[22] Filed: Jan. 30, 1974

[21] Appl. No.: 437,732

[52] U.S. Cl. ...... 23/230 B; 23/253 R; 195/103.5 R; 250/574; 356/103; 424/12
[51] Int. Cl.² .................. G01N 21/22; G01N 33/16
[58] Field of Search ........ 23/253 TP, 230 B, 253 R; 424/12; 356/103; 250/574; 195/103.5 R

[56] References Cited
UNITED STATES PATENTS

| | | | |
|---|---|---|---|
| 2,666,355 | 1/1954 | Trumit | 424/12 X |
| 3,614,231 | 10/1971 | Shaw | 250/574 X |
| 3,730,842 | 5/1973 | Wyatt | 356/103 X |
| 3,734,622 | 5/1973 | Adler | 356/103 |
| 3,754,867 | 8/1973 | Guenther | 23/253 TP |
| 3,770,380 | 11/1973 | Smith | 23/253 TP |
| 3,776,817 | 12/1973 | Pfordten | 195/103.5 R |

*Primary Examiner*—Morris O. Wolk
*Assistant Examiner*—Sidney Marantz
*Attorney, Agent, or Firm*—George R. Caruso

[57] ABSTRACT

A process for rapid qualitative analysis or quantitation of antigens or antibodies with an antigen-antibody reaction in which a precipitate is formed, which process comprises contacting a surface of a gel having a first reagent incorporated in at least a surface part thereof with a second reagent which is reactible with said first reagent to form a precipitate which remains in a surface portion of the gel, projecting a light beam through the area of contact and measuring the extent to which the light beam is scattered by the precipitate.

14 Claims, 4 Drawing Figures

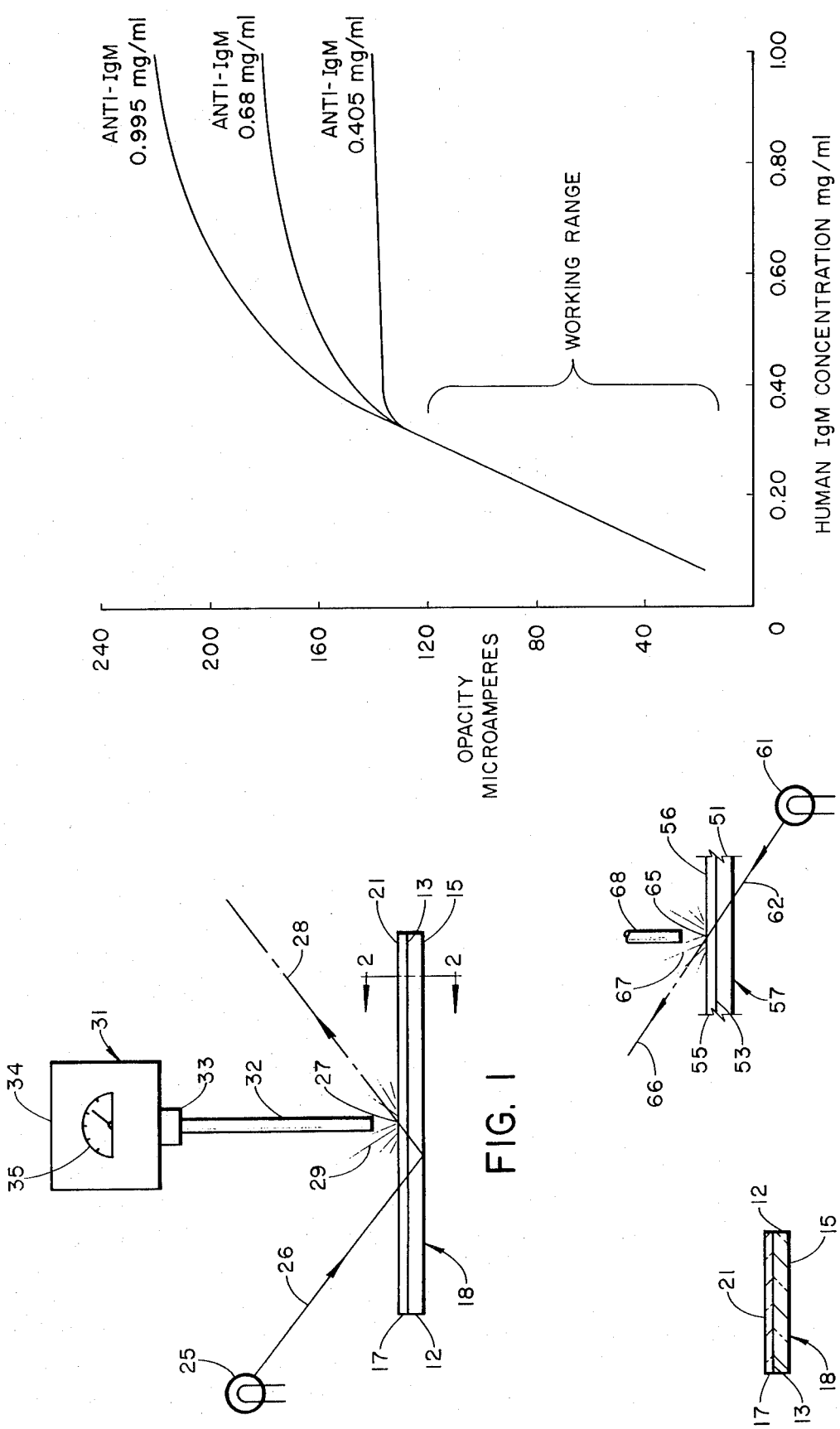

PROCESS FOR QUALITATIVE ANALYSIS OR QUANTITATION OF ANTIGENS OR ANTIBODIES

BACKGROUND OF THE INVENTION

1. Field of The Invention

This invention relates to a process for rapid qualitative analysis or quantitation of antigens or antibodies with an antigen-antibody reaction in which a precipitate is formed. More specifically this invention concerns an immunochemical process in which an antigen-antibody precipitate is formed and remains in a surface portion of a gel and in which one of the antigen or the antibody is rapidly qualitatively analyzed or measured quantitatively while the precipitate so remains.

2. Description Of The Prior Art

In recent years the formation of a precipitate by a reaction of an antigen with an antibody in a suitable gel has become an essential tool in biochemical analysis. Although such reactions were generally observed in the late 1800's and used as clinical tools soon thereafter, recent refinements in procedures have developed three distinct categories thereof, namely, single diffusion, double diffusion and immunoelectrophoresis. Each category will be discussed only briefly herein, since it is recognized that they are all well known to those skilled in this art and complete descriptions thereof may be found in references such as Work, T.S. and Work, E., Laboratory Techniques in Biochemistry and Molecular Biology, Vol. 1, 1972, North-Holland Publishing Co., Amsterdam.

For single diffusion a layer of a gel is prepared containing either an antigen or a specific antibody therefor. Since an antibody is normally incorporated in the gel, our discussion will proceed accordingly. An opening is formed in the gel and a quantity of antigen placed therein. A ring of precipitate forms about the opening and migrates radially away therefrom. After a certain fixed time the area or diameter of the ring is measured. This measurement provides data for determining the antigen concentration and, if the antigen is unknown, its identity.

Double diffusion may be carried out in a glass tube in which an antigen and an antibody are introduced into compartments on opposite sides of a common gel compartment. As the antigen and antibody diffuse through the gel a precipitate forms at a place of equivalence thereby providing data for determining the unknown concentration and/or material. Another double diffusion technique employs a layer of common gel which is prepared with openings or wells into which antigen and antibody are selectively placed. A line or arc forms in the gel at the points of equivalence of the antigen-antibody reaction thereby providing data for determining the unknown concentration or identifying the unknown material.

The third technique, immunoelectrophoresis, involves the movement of molecules in an electric field. In this technique, an electric potential is applied across a layer of gel to cause a movement through the gel of an unknown material placed in an opening in the gel. A material capable of forming a precipitate with the unknown is then introduced into another opening in the gel. The resulting precipitate pattern provides data for determining the unknown concentration or material.

Although these techniques provide accurate results, the time required to generate these results is considered a major drawback in the use thereof. For single or double diffusion at least six hours and usually days are required to obtain an end point. With immunoelectrophoresis, at least 18 hours are usually required before a determination may be made. With such long time requirements for the generation of data, it can be seen that these techniques are not compatible with modern diagnostic practices which require almost immediate results.

It is also known that with these techniques it is critical that the size and shape of the openings in the gel layer be correct and that the reagents be properly placed therein.

SUMMARY OF THE INVENTION

The process of this invention for rapid qualitative analysis or quantitation of antigens or antibodies with an antigen-antibody reaction in which a precipitate is formed includes contacting a surface of a gel having a first reagent incorporated in at least a surface part thereof with a second reagent which is reactible with said first reagent to form a precipitate. A light beam is projected through the area of contact away from the surface of the gel and the light scattered by the precipitate is qualitatively analyzed or quantitatively measured with suitable measuring means.

with the new and novel process of this invention an immunochemical assay is completed in a much shorter time than was possible with prior art techniques. Further, the preparation of the gel in which the reaction occurs is simplified as compared to the preparation of prior art gels for immunochemical assays.

BRIEF DESCRIPTION OF THE DRAWINGS

The novel process of this invention will be more easily understood by reference to the accompanying drawings in which:

FIG. 1 is a semi-schematic view of an apparatus used in practicing the invention;

FIG. 2 is a cross-sectional view taken along the line 2—2 of FIG. 1 of a gel and a supporting substrate member therefor used in the present invention;

FIG. 3 is a fragmentary semi-schematic view of an alternative apparatus used in practicing this invention; and FIG. 4 is a graph which is used in the practice of this invention to determine unknown IgM (immunoglobulin-M) concentrations, which graph consists of a family of curves for different concentrations of goat anti-human IgM in a gel, the abscissa being calibrated in human IgM concentrations and the ordinate calibrated in microamperes.

DESCRIPTION OF THE PREFERRED EMBODIMENTS

An apparatus is shown in the accompanying FIGS. 1 and 2 which is suitable for practicing the invention. It is believed that the process disclosed herein will be more easily understood if such apparatus by which it may be practiced is first described. It is to be recognized that the novel process of this invention is not limited in any way by the apparatus illustrated and discussed herein.

Referring to FIGS. 1 and 2, a substrate member 12 is shown which includes a top plane surface 13 and a reflective bottom plane surface 15. A gel layer 17 is in laminar relation with member 12, being disposed on and in intimate contact with surface 13. Gel layer 17 has an exposed top surface 21. Substrate 12 and gel 17 form a unitary device 18.

In the practice of this invention device 18 is placed on a suitable support (not shown) in operative position with respect to a light source 25 and a light sensing means 31. Light source 25 projects a light beam 26 in a direction to strike the reflective surface 15 at an oblique angle and be reflected away therefrom through an intersection point 27 with top surface 21 as a reflected light beam 28 and as scattered light beams 29. Light sensing means 31 consists of a light collecting tube 32, a phototube 33 optically aligned therewith and a current measuring means 34. Light sensing means 31 is mounted so that light collecting tube 32 is spaced from surface 21 and is optically aligned with intersection point 27, being clear of light beam 28. Current measuring means 34 has a calibrated dial 35.

Referring now to FIG. 3 in which an alternative apparatus is represented, a transparent substrate member 51 is shown which includes a top plane surface 53. A gel layer 55 is in laminar relation with member 51, being disposed on and in intimate contact with surface 53. Gel layer 55 has an exposed top surface 56. Substrate 51 and gel 55 form a substantially transparent unitary device 57 which is similar in general appearance to unitary device 18.

In the practice of this invention which this alternative apparatus, device 57 is placed on a suitable transparent support (not shown) in operative position with respect to a light source 61. Light source 61 projects a light beam 62 through substrate 51, gel 55 and an intersection point 65 with top surface 56 which continues away therefrom as a reduced light beam 66 and scattered light beams 67. A light collecting tube 68, which is a part of a light sensing means (not shown) corresponding to light sensing means 31, is spaced from surface 56 and is optically aligned with intersection point 65, being clear of light beam 66.

In practicing the process of this invention a first reagent, which is either an antigen or an antibody, is preferably uniformly incorporated or dispersed in a suitable liquified gel. For the sake of this discussion the first reagent will be an antibody. However, it is to be understood that the first reagent may equally well be an antigen. The method by which this reagent is dispersed is not critical. Accordingly, laboratory techniques which are commonly used to obtain such dispersions may be practiced, such as, agitating a mixture of the liquified gel and antibody by hand or with a suitable mixer.

The liquified gel, with the antibody dispersed therein, is deposited or cast on a suitable substrate member following known procedures and allowed to set up as a firm gel. In this manner the unitary device 18 shown in FIGS. 1 and 2 is formed.

A drop of reactant material, which may include a second reagent reactible with the first reagent to form a precipitate, in this case an antigen, is then placed on the exposed surface 21 of the gel. If the reactant material contains the antigen reactible with the antibody, a partially opaque area (the precipitate) forms within about 10 to 15 minutes in a surface portion of gel 17 under the area where the reactant material contacts the gel. The unitary device is then placed in the operative position shown in FIG. 1 so that the partially opaque area is optically aligned with light collecting tube 32. If a precipitate formed at the area of contact, the reflected light beam 28 is scattered thereby and a segment of this scattered light is transmitted by light collecting tube 32 to phototube 33 which generates an electrical current in proportion thereto. This electrical current is sensed by current measuring means 34 and converted to a suitable readout form of microamperes which is displayed on dial 35. If there is no precipitate at the contact area to scatter reflected light beam 28, less light strikes light collecting tube 32 and a correspondingly low figure is displayed by the dial.

It will be recognized that substantially the same procedural steps are practiced with the alternative apparatus shown in FIG. 3. Therefore, such step by step procedure will not be set forth herein.

The graph of FIG. 4 shows typical relationships between goat anti-human IgM (WHO nomenclature) concentrations in the gel of 0.995 mg/ml, 0.68 mg/ml and 0.405 mg/ml and observed opacity, as expressed in microamperes, for various known concentrations of human IgM in the reactant material as determined with the process of this invention. A working range of large constant slope was observed for human IgM concentrations up to about 0.40 mg/ml. In this working range, unknown antigen concentrations are readily identifiable from observed opacities. It is also to be noted from FIG. 4 that with properly selected or adjusted antigen concentrations the working range is substantially independent of the antibody concentration in the gel. However, it has been found that the antibody concentration may be reduced such that the working range is also reduced. Working ranges of large constant slope similar to that shown in FIG. 4 were also observed for other antigen-antibody reactions.

In practicing the process of this invention for the qualitative analysis and quantitation of haptens, an antiserum to a hapten conjugate, such as antiserum to estriol conjugated to bovine serum albumin, is dispersed in the gel as the first reagent. The surface of the gel is then contacted with the hapten. After a reaction period, preferably at least about 5 minutes, the surface is flooded with the second reagent reactible with the antiserum to form a precipitate. When the hapten is present the areas contacted thereby are substantially free of precipitate and the amount of scattered light is accordingly reduced. Therefore, the quantity of hapten may be determined by the scattered light.

If desirable, the hapten and the second reagent may be brought into contact with the surface of the gel at a common time. The resulting precipitate and scattered light is reduced proportional to the hapten present and the quantity thereof may be determined by such reduction.

Antigens identifiable with the process of this invention include antigenic proteins, materials having antigenic properties and bacteria. Antibodies identifiable with the process of this invention include proteins which are formed when animals are immunized with antigenic proteins, materials having antigenic properties or bacteria. Such antigens and antibodies more specifically include, but are not limited thereto, immunoglobulins, such as IgG, IgA and IgM; haptens; hormones, such as HCG (human chorionic gondotropin); hapten conjugates, such as dinitrophenyl conjugated to bovine serum albumin, estriol conjugated to bovine serum albumin, or estriol conjugated to thyroglobulin; antigens of *E. Coli;* and antibodies or antiserums therefor.

Since techniques of preparing and collecting suitable antigens and antibodies are well known and the particular technique practiced is not critical to this invention, the preparation and collection thereof will not be discussed herein.

It is recognized that at times it is difficult to definitely categorize a reagent solely as an antigen or solely as an antibody. Since this invention is concerned with a process in which a precipitate is formed rather than with the particular categorization of reagents, the name applied to a reagent is not considered to be critical. In this application an endeavor has been made to use consistent nomenclature in accordance with current practices of the related art.

The gel may be prepared from one of the many gel forming materials which are acceptable for use in immunodiffusion. Such gel forming materials include, for example, agar, cellulose acetate, starch gel, gelatin, polyacrylamide gel, or combinations thereof. This list is not considered exhaustive in view of the large number of gel forming materials which will be recognized by one skilled in the art as suitable for use in this invention.

With agar, a liquified gel is prepared with a concentration of between about 0.5–1% by weight of agar. Lower concentrations may be used, but they lack a desirable degree of firmness. Higher concentrations may also be used, but they form gel layers with a corresponding increase in background scattering of light. The concentration of the first reagent dispersed in the liquified gel is determined by referring to a graph for that particular reagent corresponding to FIG. 4. Advantageously the concentration of the first reagent is selected such that a reasonable range of concentrations for the second reagent fall under the constant slope portion of the curve. As an example, when the second reagent is human IgM, a goat anti-human IgM concentration of between about 0.4 mg/ml and 0.8 mg/ml is preferred. Although higher concentrations may be used, such are not considered beneficial in view of the slight increase in the constant slope portion of the curve as opposed to the increased reagent requirement. The liquified gel is then cast on the substrate and allowed to become firm, thereby forming the unitary device previously discussed. In this combination, the agar thickness may be between about 0.01 and 2 cm or more and is preferably between about 0.01 and 0.15 cm.

Unitary devices used in the process of this invention when prepared in this manner are stable after 1 year of storage in a high humidity environment at between 4° and 10°C. Accordingly, large quantities of unitary devices may be prepared at one time with a resulting substantial savings in personnel and in greater consistency from device to device.

For the process of this invention, the substrate must be capable of suitably supporting the gel in a stable physical and chemical condition. Preferably, this substrate will be partially transparent so that light is at least partially transferable therethrough. For example, the substrate may be selected from a glass slide, a glass mirror, a plastic slide or the like. A substrate which is reflective on the surface on which the gel is cast, although not transparent, may also be used.

The light source may be selected from the many that are readily available and known to be capable of providing a beam or ray of light of controlled dimension and substantially constant intensity. The beam generated by such light source may or may not be in the visible light range according to the requirements of the light sensing means used in practicing the process of this invention. Such light sources may include the following, each of which has been found acceptable in practicing this invention, NORMAIODE H3 lamp (12v. 55 watt), GE1630 lamp (6.5v. 2.75 amp.) and METROLOGIC He/Ne laser, Model 310.

In the preferred apparatus of this invention the light beam is projected onto a reflective surface. An angle of incidence between about 40° and 60° is preferred when the light beam is projected in this manner. With a transparent substrate the light source is situated on the side of the substrate opposite the gel and the light beam projected through the substrate and gel. When projected through the gel an angle of incidence of between about 40° and 60° may be used for the light beam. Of course, other angles may be used so long as the reflected light beam and the light beam do not interfere with the detection of scattered light beams by the light sensing means.

The light sensing means which measures the scattered light is beneficially selected from apparatus known for this capability. Such apparatus can include a phototube which senses the scattered light and generates an electrical output and a current measuring means which converts the output of the phototube to a suitable readout. Of course, the scattered light may be observed visually, although quantitation is then somewhat subjective, and the desired information recorded based upon such observation.

In practicing the process of this invention the volume of reactant material contacting the surface of the gel is not critical. This process is particularly beneficial since only a drop of reactant material including the second reagent is required although larger quantities may be used. The small quantity of reactant material required to obtain significant results is advantageous in that many evaluations may be performed with a single gel-substrate.

Should the concentration of the second reagent in the reactant material exceed the highest working range concentration therefor, the reactant material can be diluted so as to obtain a suitable concentration. In a usual clinical environment the expected normal immunoglobulin ranges in reactant material collected as samples are expected to exceed the working ranges of the process of this invention. Accordingly, it is beneficial to dilute each sample a predetermined fixed amount which is expected to bring it within the working ranges. In the following Table 1 working ranges along with the expected normal clinical ranges and predetermined dilutions to obtain a concentration within the working ranges are set forth for human IgG, human IgM and human IgA.

TABLE 1

|  | IgG | IgM | IgA |
| --- | --- | --- | --- |
| Working Range, mg/100 ml | 2–30 | 2–35 | 2–30 |
| Normal Clinical Range, mg/100 ml | 600–1500 | 50–200 | 50–250 |
| Dilution Ratio | 1/60 | 1/6 | 1/10 |
| Dilution Normal Range, mg/100 ml | 10–25 | 8–33 | 5–25 |

This process is significantly different from prior art techniques in that the second reagent is substantially totally depleted in the formation of the precipitate which unexpectedly forms and remains in the surface of the gel.

In the practice of this invention the first reagent is incorporated in the gel in a concentration which is in excess of its point of equivalence in the working range of the second reagent. Conversely the reactant material is diluted such that the concentration of the second reagent therein is less than its point of equivalence in the working range of the first reagent.

The precipitate is visible within about 10 to 15 minutes following application of the second reagent to the gel. Reproducible measurements are possible after only about thirty minutes and the measurements remain substantially constant for at least 60 minutes or more. Of course, these times may be reduced or increased by raising or lowering the temperature of the gel and its surroundings. Accordingly, with the process of this invention measurements are achieved in shorter periods of time and with smaller amounts of samples including the second reagent than was previously possible.

The amount of light scattering resulting from the unitary device or background scattering is readily determined by positioning a portion of the device which is free of the reactant material, preferably a portion adjacent to a test area on which the reactant material has been placed, in line with the light collecting tube. The resulting measurement may be subtracted from the measurement of the test area to obtain a corrected value. In a similar manner a device may be standardized with solutions of known reagent concentrations.

The following examples demonstrate the process of this invention as practiced with different gels, reactant materials, concentrations, etc. These examples are not considered as exhaustive of this invention, and it is to be recognized that one skilled in this art can readily identify equivalents that may be practiced within the scope of the process of this invention.

EXAMPLE 1

The process of this invention was used for the rapid qualitative analysis and quantitation of human IgA according to the following procedure.

A 1 percent liquified agar solution was prepared by dissolving 1 gm. of agar (Noble agar from Difco Laboratories) and 0.1 gm of sodium azide in 99 ml. of buffered (Michaelis' barbital sodium-acetate buffer pH 7) saline solution and heating the mixture, with stirring, to just below boiling.

Solutions containing goat anti-human IgA were prepared by adding IgA antiserum (obtained from Miles Research Products Division) with an assay value of 2.0 mg/ml of anti IgA, to the 1% liquified agar at 50°C. Buffer solution was then added to the mixture to yield a final concentration of 0.44 mg/ml-anti IgA (15% antiserum) and 0.7% agar. Volumes of 1.5 ml. of this solution were then cast on individual glass mirrors which were 0.19 cm. thick and 2 inches on a side. The gel was between 0.06 cm and 0.08 cm in thickness. The mirrors were kept in an $H_2O$ saturated environment thereafter to retard evaporation and allowed to cool to room temperature.

Antigen solutions were prepared by dilution of IgA standard sera (obtained from Hyland Division of Travenol Laboratories). The sera were diluted to desired concentrations with Michaelis' buffer.

For this Example the light source was a NORMAI-ODE H3 lamp (12v., 55 watt). The scattered light was detected with an RCA 931-A phototube and the current from the converted signal measured with a Kiethley 610C Electrometer.

For each qualitative analysis and quantitation the following procedure was followed.

Six drops of antigen solution, each of a volume of 5 microliters, were placed on the gel surface within a 5 minute interval. Opacity was observed within 15 minutes for the solutions with IgA and measurements thereof made at 30 minutes. The observed measurements are set forth in Table 2.

TABLE 2

| Anti IgA Concentration, mg/ml | IgA Concentration, mg/100ml | Opacity, Microamperes |
| --- | --- | --- |
| 0.44 | 6.1 | 22 |
| 0.44 | 10.2 | 38 |
| 0.44 | 20.4 | 80 |
| 0.44 | 20.1 | 125 |
| 0.44 | 39.4 | 170 |
| 0.44 | 52.5 | 188 |

The observed measurements show that as the antigen concentration increased the opacity increased, i.e. more precipitate was formed, and more light was scattered which resulted in a proportional increase in the microamperes measured. Accordingly, the amount of scattered light is dependent upon antigen concentration and therefore this process provides a basis for quantitative analysis of IgA.

EXAMPLE 2

The process of this invention was used for the rapid qualitative analysis and quantitation of human IgG according to the following procedure.

Gel-substrates were prepared in accordance with the procedure of Example 1 with the exception that goat anti-human IgG (antiserum obtained from the Research Division of Miles Laboratories, Inc.) at a concentration of 1.61 mg/ml (15% antiserum) was used instead of IgA antiserum and IgG was substituted for IgA. The observed results are set forth in Table 3.

TABLE 3

| Anti IgG, mg/ml | IgG, mg/100 ml | Opacity, Microamperes |
| --- | --- | --- |
| 1.61 | 5.2 | 70 |
| 1.61 | 10.6 | 120 |
| 1.61 | 15.9 | 205 |
| 1.61 | 20.6 | 250 |
| 1.61 | 20.6 | 235 |
| 1.61 | 23.1 | 290 |

The observed opacity measurements show that the opacity, i.e. light scattered, is dependent upon antigen concentration and therefore this invention provides a basis for quantitative analysis of IgG.

EXAMPLE 3

The process of this invention was used for the rapid qualitative analysis and quantitation of human IgM according to the following procedure.

Gel-substrates were prepared in accordance with the procedure of Example 1 with the exception that goat anti-human IgM (antiserum obtained from the Research Division of Miles Laboratories Inc.) at a concentration of 0.54 mg/ml (20% antiserum) was used instead of goat anti-human IgA and IgM was substituted for IgA. The observed results are set forth in Table 4.

TABLE 4

| Anti IgM, mg/ml | IgM, mg/100 ml | Opacity, Microamperes |
| --- | --- | --- |
| 0.54 | 4.0 | 15 |
| 0.54 | 5.6 | 20 |
| 0.54 | 10.0 | 45 |
| 0.54 | 17.0 | 60 |
| 0.54 | 25.2 | 95 |
| 0.54 | 32.0 | 100 |

The observed measurements show that the opacity is dependent upon antigen concentration and therefore this process provides a basis for quantitative analysis of IgM.

EXAMPLE 4

The process of this invention was used with a gel formed from gelatin for the rapid qualitative analysis and quantitation of IgA according to the following procedure.

A gel solution was prepared containing 10% gelatin (from Difco Laboratories) in a pH 7 buffered solution (sodium barbital, sodium acetate and HCl in 0.85% saline). To 1.2 ml portions of this solution 0.3 ml portions of anti IgA serum (Hyland) were added. Individual portions of the thus formed 20% antiserum solution (0.46 mg/ml antiserum) in an 8% gelatin solution were cast on glass mirrors which were 2 inches on a side and the devices placed in a room maintained at 4°C. for at least 60 minutes to permit gelling. The gel was between 0.06 cm and 0.08 cm in thickness.

In separate positions on the gels, 5 μl drops of IgA solutions at concentrations of 31.2 mg/100 ml, 15.8 mg/100 ml and 7.2 mg/100 ml were placed. Gradations of opacity were observed which corresponded to the increase in IgA concentration.

EXAMPLE 5

In this example the gel was formed with polyacrylamide. The following three solutions were first prepared.

| Solution A | Amount | |
| --- | --- | --- |
| 1 N HCl | 48 | ml |
| Tris(hydroxymethyl)aminomethane | 36.6 | g |
| N,N,N',N'-tetramethylethylene diamine | 0.23 | ml |
| Water to | 100. | ml |
| Solution B | Amount | |
| Acrylamide | 28.0 | g |
| N,N'-Methylenebisacrylamide (Eastman 8383) | 0.735 | g |
| Water to | 100. | ml |
| Solution C | Amount | |
| Ammonium persulfate | 0.14 | g |
| Water to | 100. | ml |

A gel solution was prepared by mixing the following materials:

| | Amount |
| --- | --- |
| Solution A | 0.2 ml |
| Solution B | 0.4 ml |
| Anti IgA serum 2.3 mg/ml | 0.2 ml |
| Solution C | 0.8 ml |

The resulting mixture was cast on a transparent plastic plate substrate. The unitary device was maintained at 40°C for 30 minutes at which time the gel was firm. This gel was about 0.07 cm in thickness.

For this example, the light source was placed under the unitary device such that the light beam passed only once through the substrate and gel.

The unitary devices prepared in this manner developed gradations of opacity when challenged with IgA substantially the same as were observed in Example 4.

EXAMPLE 6

The process of the invention was used for the rapid qualitative analysis of a hapten by an inhibition effect according to the following procedure.

Unitary devices were prepared by depositing 2 ml of a 0.7% agar (Noble) containing 20% goat DNP-antisera (obtained from Miles-Yeda) on 2 inches × 2 inches mirrored slides. (DNP=Dinitrophenyl)

Each unitary device was allowed to cool to room temperature (about 23°C.) in a water saturated environment for 30 minutes. The gel was between 0.06 cm and 0.08 cm in thickness. Five microliter drops of ε-DNP-Lysine, a hapten, (obtained from Nutritional Biochemicals Corporation), at concentrations from 0.005 to 0.02 mg/ml were spotted on the gels and allowed to react for 5 minutes. The entire surface of each gel was then flooded with 0.5 ml of a 0.3 mg/ml solution of DNP-BSA conjugate (BSA=Bovine serum albumin) and allowed to react for 5 minutes. The unitary device was rinsed gently with normal saline (0.85%) and placed in a constant humidity chamber. After 45 minutes of incubation, a general area of precipitation had developed with clear or semiclear areas related to the locations of the hapten.

The difference in opacity between the general precipitation background and the hapten locations were then measured. Microampere differences ranging from 28±4 to 96±13 were obtained as set forth in Table 4

TABLE 4

| Hapten, mg/ml | Δ Opacity, Microamperes |
| --- | --- |
| 0.005 | 28±4 |
| 0.007 | 46±11 |
| 0.01 | 66±12 |
| 0.02 | 96±13 |

The observed results demonstrated the use of this invention to measure the concentration of small hapten molecules (non-precipitating antigen molecules) by the ability thereof to inhibit the normal development of a surface precipitate area.

EXAMPLE 7

The procedure of Example 6 was used in this example with the exception that rabbit anti-estriol was used instead of DNP-antisera, estriol was used as the hapten instead of ε-DNP-Lysine, and estriol-thyroglobulin was used as the conjugate instead of DNP-BSA.

The resulting inhibited precipitation areas were substantially the same as those observed in Example 6.

EXAMPLE 8

The process of this invention was used for the qualitative analysis of HCG according to the following procedure.

Lyophilized antiserum to HCG (obtained from Nutritional Biochemicals Corporation, Cleveland, Ohio) was diluted according to manufacturer's instructions. A solution was prepared consisting of the antiserum, liquified 2% agar and phosphate-buffered physiological saline so that final concentrations of 50% antiserum and 0.7% agar were obtained. The solution was deposited upon a mirror and allowed to gel.

One hour after deposition upon the gel of 5 μl of a solution containing 1 unit of HCG/ml in buffered saline, a spot of precipitate was observed in the area of contact. This result indicated that the process of this invention provides a rapid and early visual indication of pregnancy.

EXAMPLE 9

The process of this invention was used to determine whether or not a specific bacterial species was present in a reactant material according to the following procedure.

Unitary devices were prepared by depositing a 0.7% agar solution containing 20% E. Coli Poly A antiserum on mirrors.

E. Coli 0111:B4 was incubated for 18 hours in 10 ml. of BHI nutrient broth and the cells harvested by centrifugation. The cells were twice washed with saline solution, centrifuged and the supernatant discarded. The recovered cells, estimated to be $10^{10}$ in number, were mixed with 50 μl of a saturated aqueous solution of ethylenediaminetetraacetic acid at pH 7.0 and incubated at 55°C. for 30 minutes. Then 50 μl of lysozyme solution (16 mg/ml in water) was added to the cell mixture and incubation continued an additional 30 minutes with occassional stirring. After cooling, cell debris was removed by centrifugation. The clear supernatant was maintained at 100°C. for 30 minutes to precipitate lysozyme, which was removed by centrifugation.

The clear supernatant was diluted 1:10, 1:100 and 1:1000 respectively with an aqueous solution buffered to a pH of 7 with phosphate buffer. Five μl aliquots of each dilution were deposited on separated areas of the surface of the gel and incubated for 1 hour at about 23°C. in a high humidity chamber. Spots of precipitate of decreasing opacity were observed in the areas of contact for the 1:10 and 1:100 dilutions respectively. No spots were visually observed for the area contacted by the 1:1000 dilution.

These observations established that the process of this invention is effective in detecting bacteria.

It has thus been shown with the above examples that this invention provides a new and novel process which results in more rapid qualitative analysis or quantitation of antigens or antibodies.

What is claimed is:

1. A process for rapid qualitative analysis and/or quantitation of antigens or antibodies with an antigen-antibody reaction in which a precipitate is formed, the process comprising contacting a surface of a gel having a first reagent which includes an antigen or an antibody incorporated in at least a surface part thereof with a second reagent which includes an antigen or an antibody and which is reactive with said first reagent to form a precipitate which remains in a surface portion of said gel, projecting a light beam through said surface portion of said gel, measuring the extent to which said light beam is scattered by said precipitate, and correlating the extent to which said light beam is scattered to analytical data sought.

2. The process of claim 1 in which said first reagent is an antigen and said second reagent is an antibody.

3. The process of claim 1 in which said first reagent is an antibody and said second reagent is an antigen.

4. The process of claim 1 in which said light beam is projected through said surface portion in a direction away from said gel surface.

5. The process of claim 1 in which said light beam is projected at an angle oblique to said surface of said gel.

6. The process of claim 1 including as additional steps projecting said light beam through a second surface portion of said gel which is free of said second reagent, and measuring the extent to which said light beam is scattered by said second surface portion, whereby the background scattering of a unitary device comprising a substrate and said gel is measured.

7. The process of claim 1 including as an additional step prior to contacting said surface with said second reagent, contacting a surface area of said gel with a third reagent reactible with said first reagent to inhibit subsequent formation by said first reagent of a precipitate in a surface portion of said gel adjacent said surface area when said surface area is contacted with said second reagent, whereby said third reagent may be qualitatively analyzed or quantitated according to the measured scattering of said light beam.

8. The process of claim 1 including as an additional step prior to contacting said surface with said second reagent, mixing with said second reagent a third reagent reactible with said first reagent to inhibit the subsequent formation thereby of a precipitate with said second reagent, whereby said third reagent may be qualitatively analyzed or quantitated according to the measured scattering of said light beam.

9. The process of claim 1 in which said gel is supported by and is in intimate contact with a substrate member.

10. The process of claim 9 in which said substrate member is transparent.

11. The process of claim 10 in which said light beam is first projected through said transparent substrate member and then through said surface portion of said gel.

12. The process of claim 9 in which said substrate member is a mirror which reflects toward said gel.

13. The process of claim 12 in which the reflective surface of said mirror is adjacent said gel.

14. The process of claim 12 in which the reflective surface of said mirror is the surface thereof opposite the surface thereof supporting said gel.

* * * * *